(12) United States Patent
Kruger

(10) Patent No.: US 7,000,573 B2
(45) Date of Patent: Feb. 21, 2006

(54) COMPRESSION IGNITION ENGINES

(75) Inventor: Uli Kruger, Adelaide (AU)

(73) Assignee: Kruger Ventures Pty Ltd, (AU)

(*) Notice: Subject to any disclaimer, the term of this patent is extended or adjusted under 35 U.S.C. 154(b) by 0 days.

(21) Appl. No.: 10/479,760

(22) PCT Filed: Jun. 4, 2002

(86) PCT No.: PCT/AU02/00708

§ 371 (c)(1),
(2), (4) Date: Jun. 2, 2004

(87) PCT Pub. No.: WO02/099265

PCT Pub. Date: Dec. 12, 2002

(65) Prior Publication Data

US 2004/0206329 A1   Oct. 21, 2004

(30) Foreign Application Priority Data

Jun. 4, 2001 (AU) .................................... PR5435

(51) Int. Cl.
F02M 21/04 (2006.01)

(52) U.S. Cl. .............. 123/27 GE; 123/306; 123/525; 123/590

(58) Field of Classification Search ................ 123/1 A, 123/27 GE, 306, 525, 590, 431, 527, 528, 123/591, 592; 48/180.1

See application file for complete search history.

(56) References Cited

U.S. PATENT DOCUMENTS

| 2,659,667 | A | * | 11/1953 | Bosdet ........................ 123/592 |
| 2,695,011 | A | * | 11/1954 | Dodds et al. ............... 123/1 A |
| 3,698,365 | A |   | 10/1972 | Hallberg |
| 4,463,734 | A | * | 8/1984  | Akeroyd ...................... 123/525 |
| 4,513,727 | A | * | 4/1985  | Lagano et al. .............. 123/525 |
| 4,520,766 | A | * | 6/1985  | Akeroyd ................. 123/27 GE |
| 4,524,730 | A | * | 6/1985  | Doell et al. ............. 123/27 GE |
| 4,553,504 | A | * | 11/1985 | Duggal et al. .............. 123/1 A |
| 4,614,168 | A | * | 9/1986  | Batchelor .............. 123/27 GE |
| 4,694,802 | A |   | 9/1987  | Lowi, Jr. |
| 4,953,515 | A | * | 9/1990  | Fehr et al. .................. 123/526 |
| 4,958,598 | A | * | 9/1990  | Fosseen ...................... 123/1 A |
| RE35,181  | E | * | 3/1996  | Hudz ......................... 261/142 |
| 5,769,062 | A |   | 6/1998  | Antao |
| 6,145,495 | A | * | 11/2000 | Whitcome ................... 123/525 |
| 6,550,446 | B1| * | 4/2003  | Robley, Jr. ................. 123/306 |

FOREIGN PATENT DOCUMENTS

| AU | 71050/81 B  |   | 12/1982 |                |
| DD | 221797 A1   |   | 5/1985  |                |
| GB | 391535      | * | 5/1933  | ................. 123/592 |
| GB | 865671      | * | 4/1961  | ................. 123/590 |
| GB | 2060765     | * | 5/1981  |                |
| IT | 528529      | * | 6/1955  | ................. 123/590 |
| JP | 2001-241342 A |  | 9/2001 |                |

* cited by examiner

Primary Examiner—Tony M. Argenbright
(74) Attorney, Agent, or Firm—Akerman Senterfitt

(57) ABSTRACT

A method and arrangement of supplying a supplementary fuel (8) to a compression ignition internal combustion engine wherein an air supply (3) to the engine is first caused to pass through a natural vortex creator (1), and a supply of supplementary fuel (8) to the engine is supplied into a low pressure area the natural vortex (1) which provides a substantially constant ratio of supplementary fuel to main fuel through varying load conditions.

7 Claims, 4 Drawing Sheets

COMPRESSION IGNITION ENGINES

TECHNICAL FIELD

This invention relates to engines of a type often referred to as "diesel engines" but which are more generally described as compression ignition internal combustion engines.

BACKGROUND ART

While such engines use "diesel" as a fuel, such fuel can be usefully supplemented by other fuels in certain circumstances.

This invention relates to a fuel supplementation process and method and to an arrangement for using supplementary fuels in engines of this type.

Characteristics of this type of engine include a main fuel injection system, means to change an amount of main fuel being injected into the engine in response to load demands on the engine, and an air supply. This type of engine works best with an approximately constant pressure cycle which provides a relatively flat torque curve and generally low specific fuel consumption. However this ideal is not readily achieved. One factor in this is that in order to achieve a reliable and instant ignition requires a fuel with a high cetane rating but in order to then achieve a long slow burn requires a fuel with a low cetane rating. To achieve reliable ignition with a subsequent long slow burn then essentially requires two different fuels. This is where fuel supplementation can be very advantageous where a main fuel is a fuel with a high cetane rating and the subsequent supplementary fuel is a fuel which is high octane and low cetane rating.

It is currently known to provide some fuel supplementation by adding supplementary fuel into an air supply where a "diesel" or compression ignition engine is turbo charged.

However, one of the difficulties that currently exists is the difficulty of ensuring that there is an appropriate ratio of supplementary fuel and air through changing load conditions.

DISCLOSURE OF THE INVENTION

In accordance with this invention, I have found that there is very significant advantage achieved by providing that an air supply for a compression ignition type engine be drawn through an arrangement effecting a natural vortex with a low pressure center core with such air and then connecting the low pressure core of any such vortex formed with a supply of supplementary fuel so that the supplementary fuel will be drawn in to the low pressure core of the vortex and thereby be supplied through an air intake of the engine.

Such an arrangement I have surprisingly discovered has an advantage that a beneficial ratio of air and a supplementary fuel is maintained by the characteristics of the natural vortex through changing load conditions.

This is in contradiction for instance with more traditional techniques used to effect control of proportionality.

In this way then, it is found that the ratio of supplementary fuel to main fuel supply can remain more constant through changing load levels even though the engine speed and the air being drawn into the engine as a result of that engine speed will not vary substantially through such changing load levels.

This has a significant advantage that through an operating cycle of an engine with changing loads that the ratio will be kept such that pre-ignition that might otherwise be caused by an excess of supplementary fuel will be reduced. It also has the advantage that a high octane fuel can be used as the supplementary or auxiliary fuel. The advantage of this is that once ignition has been effected through the compression of the main fuel, the slower burning high octane fuel will extend a burning period contributing to a more extended constant pressure through the burning cycle.

In one form then, the invention can be said to reside in a method of supplying a supplementary fuel supply to a compression ignition internal combustion engine, which includes the step of having an air supply to the engine first caused to pass through a natural vortex creator, and effecting a supply of supplementary fuel to the engine by introducing supplementary fuel into a low pressure area within a centre of any natural vortex adapted to be created by the vortex creator.

A characteristic of such engines is that they have their speed constrained by a governor with increase or decrease in power being achieved by an increase or decrease in fuel being injected into the engine with substantially the same airflow being maintained. This however means that there will be relatively minor changes in air flow rates in response to load output changes. My discovery has been that by use of the natural vortex the amount of supplementary fuel being in preference, the supply of fuel in fluid form is provided at a substantially constant pressure so that the amount of fuel being supplied into the low pressure region of the vortex will be in proportion to such low pressure and this in turn will result in a relatively constant ratio of fuel to air being supplied to a downstream "diesel" engine.

In preference, the fuel being a fluid is a gas although liquid fuels can be used in other instances where there is a preliminary vaporisation by use of a second natural vortex creator.

There is advantage in providing a supplementary fuel as a gas in that this then provides a higher octane fuel which is then mixed with a lower octane fuel so that there is a longer burn rate.

However, there can be other reasons to have a different fuel for instance where the supplementary fuel is hydrogen. This can provide for extremely clean or environmentally good outputs while there may be some loss in efficiency which however is acceptable. The advantage of the invention in providing reliable main fuel to supplementary fuel ratios in varying load conditions is even more useful with such a gas where high supplement to main fuel ratios are desirable.

In experiments conducted so far, it is found that the balance of fuels should be such that the total mixture is slightly lean for instance, a ratio of 20:1 as compared to perhaps a stoichiometric mixture of 16: which is the ratio for LPG.

The advantages of this arrangement in a preferred example offer at least one or more of the following; namely, additional power available from an existing engine, lower exhaust temperatures that otherwise would be expected, less fuel and oil contamination, smoother running and costs savings.

The creation of a natural vortex is possible using appropriately shaped vanes or apertures passing through a conduit aligned so as to cause the air to be drawn through these to form a spiral path. A natural vortex is one where a center of the vortex is at a lower pressure than its outer parts. This is in contrast to a Prior examples of gas supplementation have been traditionally of what is called "a gas fumigation type" where at a selected load on the "diesel" engine, gas is introduced into the intake manifold in order to increase the power. An example of this is available currently on the Internet at the URL being www.bullydog.com. or there is a system known as "torque master system" for trucks sold under the registered trade mark "CATERPILLAR".

Under such previous techniques, a supplementation rate of 30% supplementary fuel by weight as compared to a total fuel being supplied has been accepted by the industry as a practical upper limit in that higher supplementation has resulted in pre-ignition effects which make this increase unacceptable.

With the current invention and in relation to the embodiment, supplementation up to 75% of the total fuel provided has been found to be possible without the pre-ignition effect. There has also been improvement in engine efficiency with exhaust temperatures lowered in several trials by some 40° C.

In a further form then the invention can be said to reside in a method of supplying a fuel supply to a compression ignition internal combustion engine which includes having an air supply to the engine first caused to pass through a natural vortex creator, and effecting a supply of supplementary fuel to the engine by introducing supplementary fuel into a low pressure area within a central area of any natural vortex being created by the vortex creator.

In preference the main fuel supply is of a high cetane rating and the supplementary fuel is of high octane rating.

In preference the supplementary fuel is being provided at a substantially constant pressure to the low pressure area within a central area of a natural vortex.

In preference the supplementary fuel is first supplied as a liquid which is introduced into a low pressure area of a second natural vortex creator with a low pressure center core which is arranged to effect a natural vortex with air being drawn through it by the engine which then in turn fed as a vapour into the low pressure area of a vortex created by the first said natural vortex creator as the supplementary fuel.

In a further form the invention can be said to reside in a compression ignition internal combustion engine including in its air supply a natural vortex creator with a conduit connecting an outlet of the vortex creator with an air inlet of the engine, a conduit connecting a source of supplementary fuel with the vortex creator so as to have an outlet of the said conduit communicating with a low pressure center of a vortex.

In a further form the invention can be said to reside in a compression ignition internal combustion engine including at least one piston within a cylinder, a main fuel injector to effect injection of fuel into each respective cylinder, means to effect a change in quantity of main fuel being injected into the cylinder in response to change in load applied to the engine, a conduit connecting an outlet of a natural vortex creator with an air inlet of the cylinder of the engine, a conduit connecting a source of supplementary fuel with the vortex creator with its outlet communicating with a low pressure center of the vortex creator.

In a further form the invention can be said to reside in a compression ignition internal combustion engine including at least one piston within a cylinder, a main fuel injector to effect injection of fuel into each respective cylinder, means to effect a change in quantity of main fuel being injected into the cylinder in response to change in load applied to the engine, a conduit connecting an outlet of a natural vortex creator with an air inlet of the cylinder of the engine, a conduit connecting a source of supplementary fuel in gaseous form with the vortex creator with its outlet communicating with a low pressure center of the vortex creator, means connecting a source of the supplementary fuel as a liquid to a low pressure area of a second natural vortex creator which is arranged to effect a natural vortex with air being drawn through it by the cylinder, a conduit connecting an outlet of the second natural vortex creator to a low pressure area of the first said natural vortex creator.

BRIEF DESCRIPTION OF THE DRAWINGS

The invention will be better understood when described with reference to an embodiment, and accordingly this is described with the assistance of drawings where.

BEST MODE FOR CARRYING OUT THE INVENTION

Figure 1:
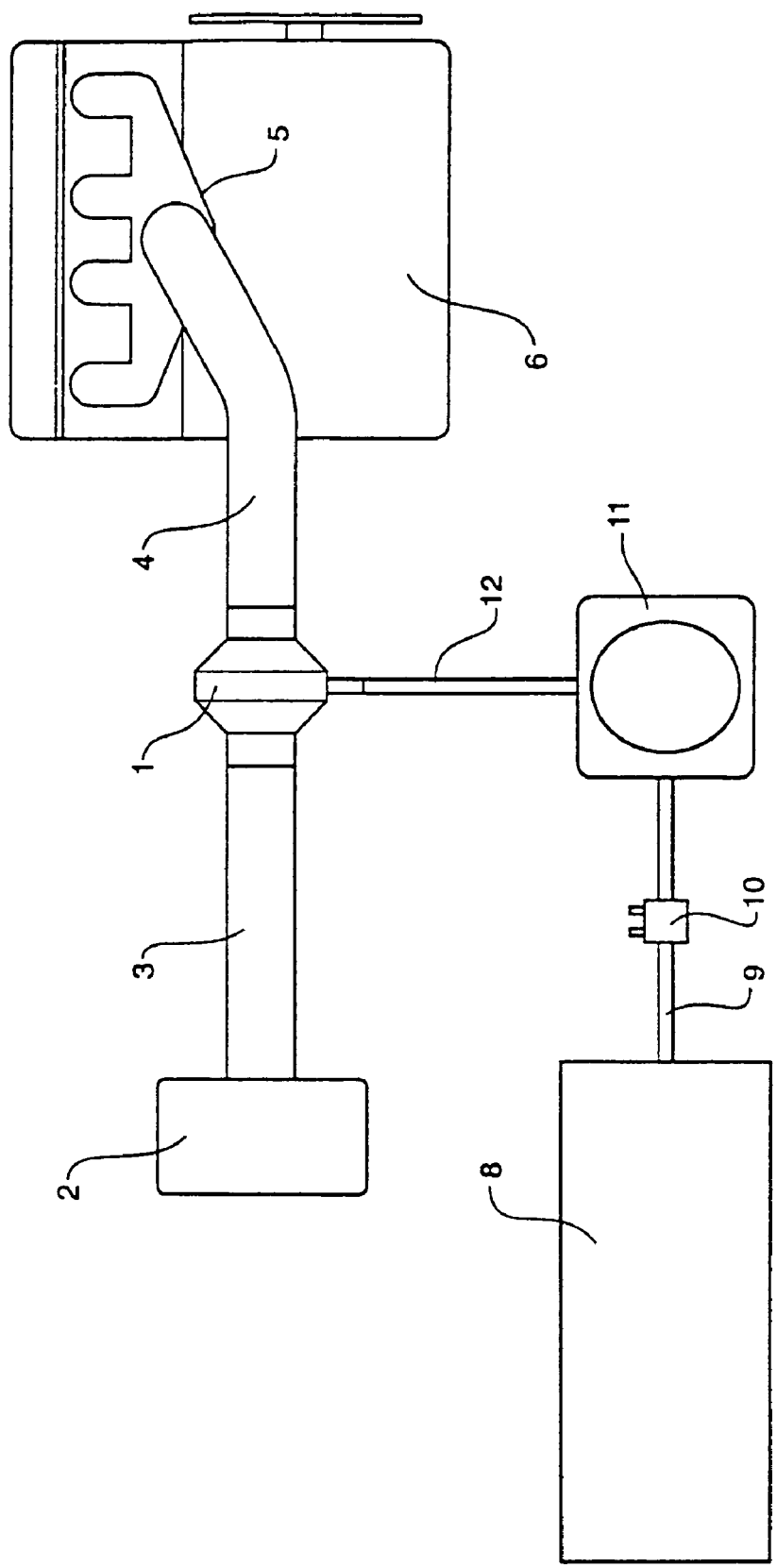
FIG. 1 is a schematic layout illustrating the way in which a vortex creator is coupled in an airflow stream through to a "diesel" engine.

Referring in detail to the drawings, and in particular to FIG. 1, there is a natural vortex creator 1 which is positioned in line from an air inlet filter 2 which has a passageway 3 directing air into the vortex creator 1 which thereafter is connected by passage 4 through to manifold 5 of a "diesel" engine 6.

Figure 2:
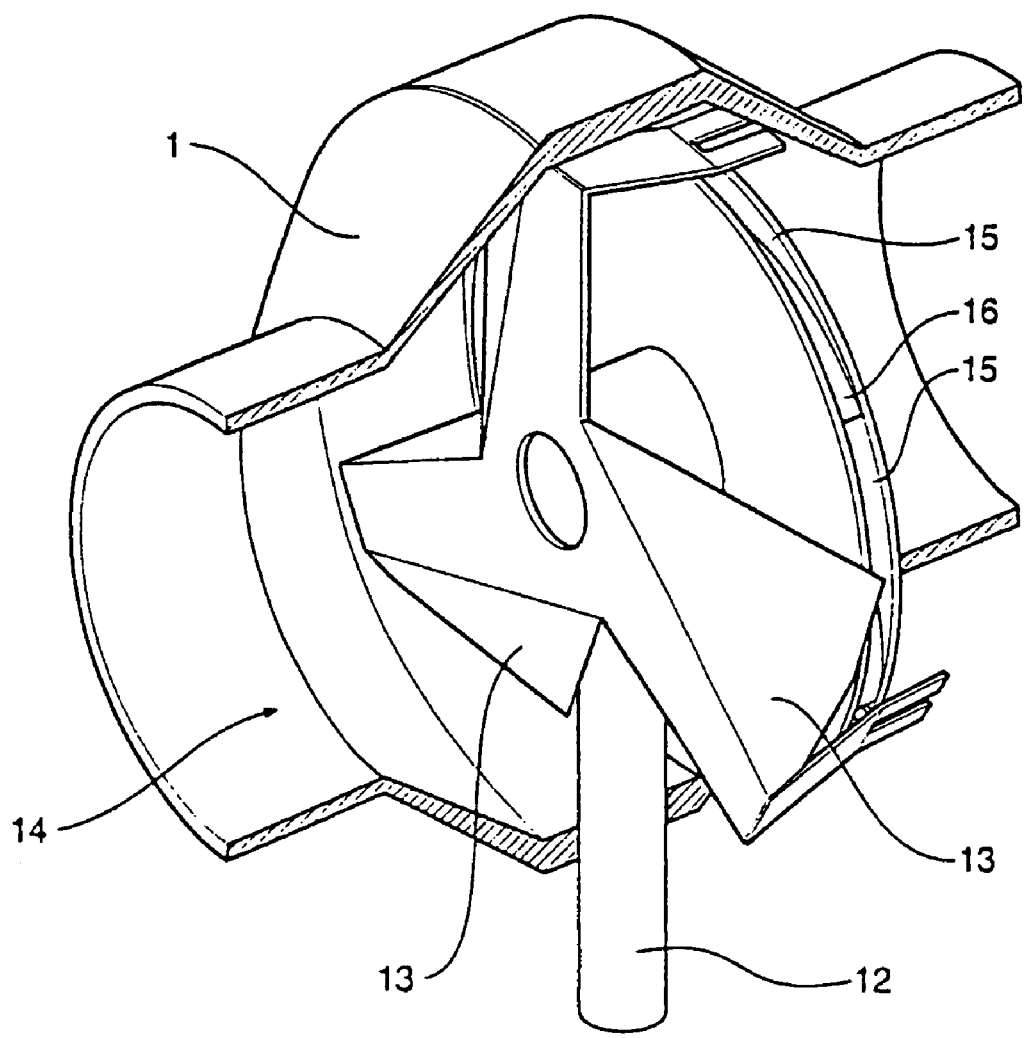
FIG. 2 is a part cut away of a vortex creator with an inlet tube for the supplementary fuel supply.
Figure 3:
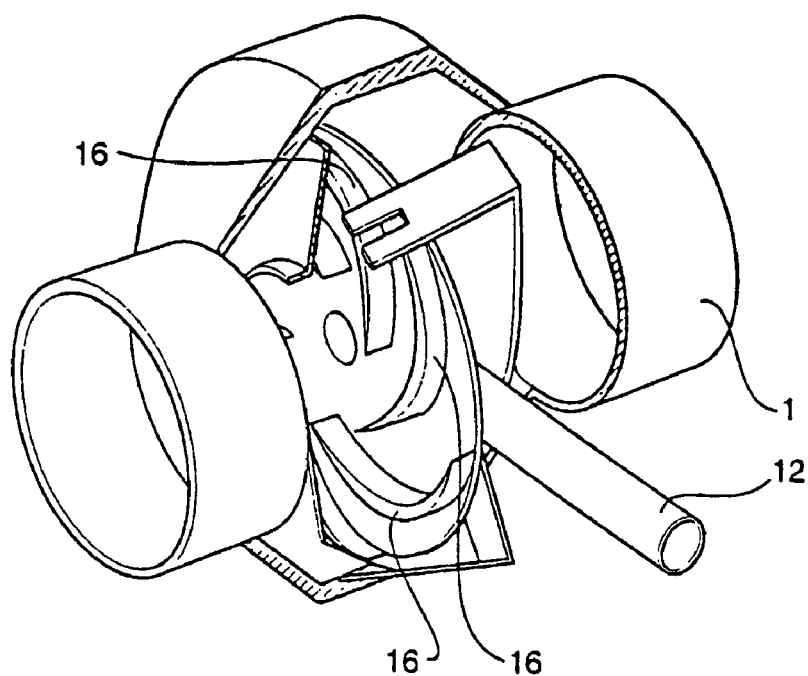
FIG. 3 is a part cut away perspective view of a vortex creator including a gas input.
Figure 4:
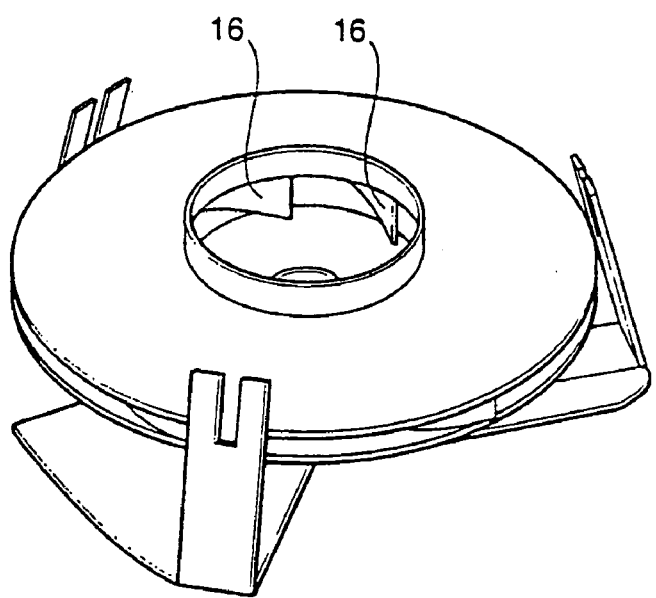
FIG. 4 is a part cut away of a different view of the vortex creator showing in this case curved vanes which direct air into a natural vortex formation.

A low pressure gas (LPG) supply which holds gas in liquid form is shown at 8 and this is connected via conduit 9 through solenoid operated valve 10 to a liquid to gas converter at 11. The liquid to gas converter then supplies gas through conduit 12 at a relatively constant pressure so that this is fed into a low pressure center of any natural vortex that is formed within the vortex creator 1. The vortex creator itself is shown in greater detail in FIG. 2 through to 5, and consists of a plurality of vanes such as is shown at 13 which assist to provide a preliminary circular path to air being introduced in the direction 14 so that the air then passes into channels shown at 15 typically which is each defined by vanes such as at 16 which are in arcuate form and chosen so as to provide the air that passes through this into a central area will thereafter follow and be caught within a natural vortex with its centripetal effect being tapped.

Such a vortex which is variously referred to as a centripetal or natural vortex is to be compared with an alternate type vortex which might be called a centrifugal vortex but such an alternate effect generally will not have a low pressure center.

Such distinctions however may be academic in practise where some characteristics of both may be exhibited in a formation. For this reason it is perhaps for the sake of accuracy better to refer to the natural vortex where there is a low pressure center at its core and where this is being used for the purposes of this invention. Therefore while the term centripetal vortex has been used in some instances it is better to say that the vortex is having its centripetal component being used and we have used the term "natural vortex with a low pressure center" to distinguish the characteristic required.

The vortex might be distinguished by reference to a centripetal or natural vortex providing a low pressure at its centre.

There are known devices to provide a centripetal vortex but we have described once instance only of this which has been found to provide good effect.

Figure 5:
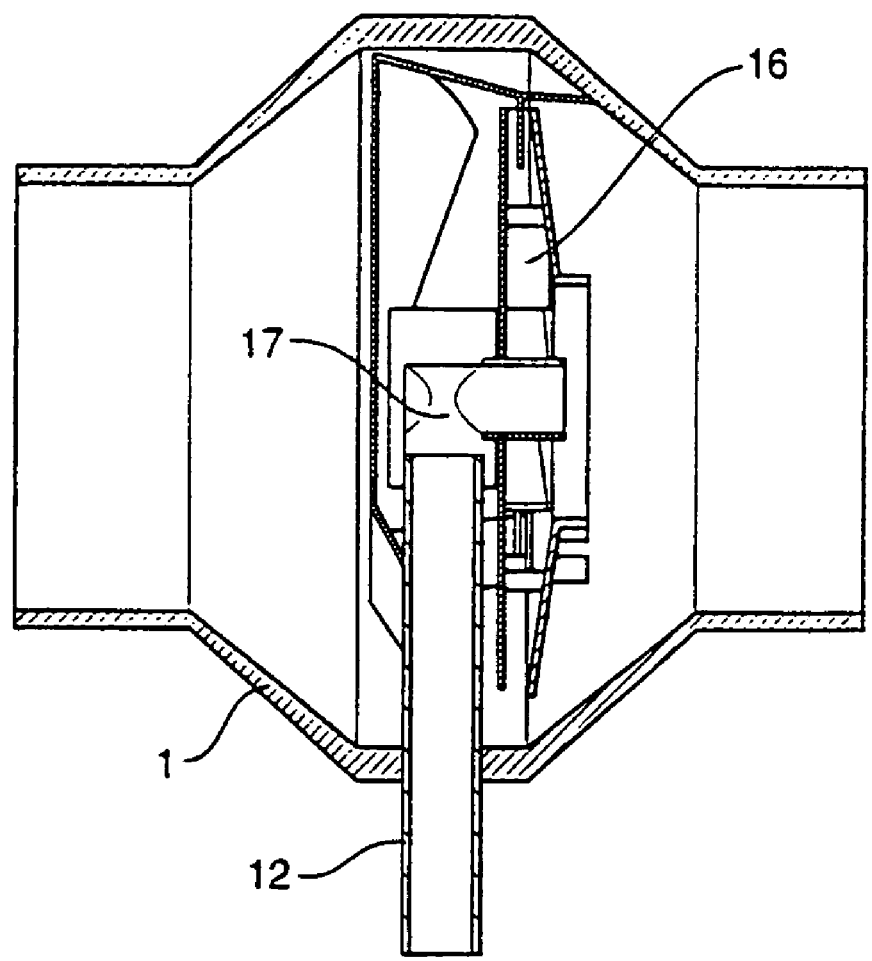
FIG. 5 is a cross sectional view showing dimensions of the parts providing for the vortex creation.

According to this invention and this embodiment in particular however, air is drawn through such a vortex creator so as to cause a low pressure to be caused at the centre of such a vortex, and conduit 12 has its opening as is shown specifically in FIG. 5 so as to be located at the relative centre 17 so that it will connect with the lowest pressure position of the vortex that might be formed by the air passing through the channel between the vanes 16 and then through a downstream passage into the "diesel" or compression ignition internal combustion engine.

Using this arrangement to effect a control of the degree of mixing of air with gaseous fuel has shown itself to provide significant reliability in respect of such ratio, especially over a reasonable range of power demands and this has had the advantage of being able to maintain performance in a over a range of power demands.

Hitherto this has been attempted to be achieved by electrical devices which are complex and may have serious reliability difficulties. The arrangement using simply a natural vortex is not dependent on electrical components or a large number of moving parts and is therefore significantly more reliable.

An example of actual results is now set out which generally show the extent of constancy of results thus far obtained. It is of value to say that the reason the arrangement works so well in the trials conducted so far is not understood. It is suspected that the dynamic nature of pressure levels within a centripetal vortex are such as to cause this to respond to rapidly changing pressure levels at an outlet end with a very rapid change in its low pressure at its inlet end. However, this is a case where it is going to require significant further investigation to prove any theory.

The example is now given as follows;

EXAMPLE 1

The internal combustion engine is a Perkins T4-236 driving a 52 kW generator set running at 3000 rpm. The engine has a displacement of 3.86 liters and a compression ratio of 16:1. The intake to the engine has been modified to include a water heated gasifier for LPG and includes a natural vortex creator in line with the air inlet with liquid petroleum gas which is fed through the LPG gasifier so that the outlet from this will then be connected directly to a low pressure centre core of the natural vortex creator.

The results are summarised in the following table which illustrates the consistency in the ratio of fuel power input derived from diesel as compared to total fuel input power of the combined fuels for increased loads, where for 20 kW this ratio is 0.35, 30 kW is 0.37 and for 40 kW is 0.44.

Similarly, the percentage LPG by mass of supplemented fuel varied little over the range of power outputs, where for 20 kW the fuel was approximately 63% LPG by mass, 61% LPG by mass at 30 kW and 54% LPG by mass at 50 kW. The advantages of being able to operate with such high percentage supplementation are obvious in terms of cost savings.

Comparison figures for diesel alone are given from which it can be seen that there are significant reductions in carbon dioxide and nitrous oxide levels in the exhaust when supplementing. Furthermore, there is only a very marginal drop in overall thermal efficiency of the plant when comparing supplementation of fuel with diesel alone for a given power output.

| LOAD kW | time/ 200 mls | kW of Diesel kW | mass of LPG kg | kW of LPG kW | Efficiency % | Diesel Mass reduc % | Energy ratio Diesel/ Total |
|---|---|---|---|---|---|---|---|
| 20 | 109 | 64.7 | 0 | 0 | 30.9 | 100 | 1.00 |
| 20 | 214 | 33.0 | 0.284 | 61.4 | 21.2 | 49.1 | 0.35 |
| 30 | 77 | 91.6 | 0 | 0 | 32.7 | 100 | 1.00 |
| 30 | 168 | 42.0 | 0.254 | 70.0 | 26.8 | 54.2 | 0.37 |
| 40 | 59 | 119.6 | 0 | 0 | 33.5 | 100 | 1.00 |
| 40 | 125 | 56.4 | 0.192 | 71.1 | 31.4 | 52.8 | 0.44 |

| LOAD kW | $CO_2$ % | $CO_2$ reduc % | NO ppm | NO reduc % | Opacity | Opacity red % | AFR | HC |
|---|---|---|---|---|---|---|---|---|
| 20 | 6.23 | | 366 | | 16 | | 34.2 | 0 |
| 20 | 5.8 | 6.9 | 221 | 39.6 | 4 | 75.0 | 30.5 | |
| 30 | 8.18 | | 645 | | 34 | | 26.6 | 0 |
| 30 | 7.47 | 8.7 | 400 | 38.0 | 14 | 58.8 | 26.3 | |
| 40 | 8.71 | | 938 | | 50 | | 22.7 | 0 |
| 40 | 7.88 | 9.5 | 553 | 41.0 | 33 | 34.0 | 23.3 | 202 |

From these tests, it has been established so far that the constant ratio over varying loads can be kept substantially constant by the relatively simple mechanism being described which has significant advantage through a range of supplementary fuels and other compression ignition internal combustion engines.

It is found that this arrangement is applicable both to direct and indirect injection types of "diesel" engines, and it is also applicable to "diesel" engines which do not have turbo boost. As such, it is therefore even more useful.

The invention claimed is:

1. A method of supplying a fuel supply to a compression ignition internal combustion engine which includes having an air supply to the engine first caused to pass through a natural vortex creator, and effecting a supply of supplementary fuel to the engine by introducing supplementary fuel into a low pressure area within a central area of any natural vortex being created by the vortex creator.

2. A method of supplying a fuel supply to a compression ignition internal combustion engine as in claim 1, further characterised in that a main fuel supply is of a high cetane rating and the supplementary fuel is of high octane rating.

3. A method of supplying a fuel supply to a compression ignition internal combustion engine as in claim 1, wherein the supplementary fuel is being provided at a substantially constant pressure to the low pressure area within a central area of a natural vortex.

4. A method of supplying a fuel supply to a compression ignition internal combustion engine as in claim 1, further characterised in that the supplementary fuel is first supplied as a liquid which is introduced into a low pressure area of a second natural vortex creator which is arranged to effect a natural vortex with air being drawn through it by the engine which then in turn as a vapour is fed into the low pressure area of a vortex created by the first said natural vortex creator as the supplementary fuel.

5. A compression ignition engine including in its supply a natural vortex creator, a conduit connecting an outlet of the vortex creator with an air inlet of the engine, a conduit connecting a source of supplementary fuel with the vortex creator so as to have an outlet of the said conduit communicating with a low pressure center of a vortex.

6. A compression ignition internal combustion engine including at least one piston within a cylinder, a main fuel injector to effect injection of fuel into each respective cylinder, means to effect a change in quantity of main fuel being injected into the cylinder in response to change in load applied to the engine, a conduit connecting an outlet of a natural vortex creator with an air inlet of the cylinder of the engine, a conduit connecting a source of supplementary fuel with the vortex creator with its outlet communicating with a low pressure center of the vortex creator.

7. A compression ignition internal combustion engine including at least one piston within a cylinder, a main fuel injector to effect injection of fuel into each respective cylinder, means to effect a change in quantity of main fuel being injected into the cylinder in response to change in load applied to the engine, a conduit connecting an outlet of a natural vortex creator with an air inlet of the cylinder of the engine, a conduit connecting a source of supplementary fuel in gaseous form with the vortex creator with its outlet communicating with a low pressure center of the vortex creator, means connecting a source of the supplementary fuel as a liquid to a low pressure area of a second natural vortex creator which is arranged to effect a natrual vortex with air being drawn through it by the cylinder, a conduit connecting an outlet of the second natural vortex creator to a low pressure area of the first said natural vortex creator.

* * * * *